United States Patent
Zhang

(10) Patent No.: US 12,300,782 B2
(45) Date of Patent: May 13, 2025

(54) SOLID STATE BATTERIES, SSE BATTERIES, LITHIUM METAL BATTERIES WITH SOLID STATE ELECTROLYTES, HSSE, SEPARATORS, AND/OR COATINGS, AND/OR RELATED METHODS

(71) Applicant: Celgard, LLC, Charlotte, NC (US)

(72) Inventor: Zhengming Zhang, Rock Hill, SC (US)

(73) Assignee: CELGARD, LLC, Charlotte, NC (US)

( * ) Notice: Subject to any disclaimer, the term of this patent is extended or adjusted under 35 U.S.C. 154(b) by 795 days.

(21) Appl. No.: 17/045,494

(22) PCT Filed: Apr. 4, 2019

(86) PCT No.: PCT/US2019/025795
§ 371 (c)(1),
(2) Date: Oct. 6, 2020

(87) PCT Pub. No.: WO2019/195553
PCT Pub. Date: Oct. 10, 2019

(65) Prior Publication Data
US 2021/0167420 A1    Jun. 3, 2021

Related U.S. Application Data

(60) Provisional application No. 62/653,603, filed on Apr. 6, 2018.

(51) Int. Cl.
*H01M 10/0565*  (2010.01)
*H01M 4/36*  (2006.01)
(Continued)

(52) U.S. Cl.
CPC ....... *H01M 10/0565* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS

| 5,085,952 A | 2/1992 | North |
| 5,342,710 A | 8/1994 | Koksbang |

(Continued)

FOREIGN PATENT DOCUMENTS

KR    20180031459 A  *  3/2018  .......... H01M 10/054

OTHER PUBLICATIONS

Besenhard, J.O., "Handbook of Battery Materials", Wiley-VCH, 1999, pp. 552-563.

(Continued)

*Primary Examiner* — Robert S Carrico
(74) *Attorney, Agent, or Firm* — J. Clinton Wimbish; Maynard Nexsen PC

(57) ABSTRACT

The problems or issues faced by typical larger SSE batteries are solved by providing an interface or interfacial layer at least between the anode, which comprises Li or Na, and the solid state electrolyte (SSE). In some other embodiments, an interfacial layer may be provided between the anode, which comprises Li or Na, and the SSE, and an interface or interfacial layer may also be provided between the cathode and the SSE. In at least selected embodiments, aspects or objects, the interfacial layer may act as a shock absorber between a SSE (e.g., a sulfide glass SSE) and an anode material that is soft compared to the SSE (e.g., Li metal). In other embodiments, the interfacial layer may act as a shock absorber between the SSE and a cathode material that is softer than the SSE. In at least certain embodiments, the interfacial layer may improve ionic conductance between the anode and the SSE and/or the SSE and the cathode. In at least certain selected embodiments, the interfacial layer (Continued)

may prevent or deter lithium deposition and dendrite growth at the interface between the anode and the SSE. Interface defects at the interface between the anode and the SSE may allow lithium deposition and dendrite growth. The dendrites may continue to grow through cracks in the SSE causing a short, which is a safety issue. The inventive interfacial layer between the anode and the SSE may prevent or deter this. In at least some embodiments, the interfacial layer may be a porous polymer layer filled with liquid electrolyte and may improve ionic conductance between the anode and the SSE and/or the SSE and the cathode. In certain embodiments, the anode interface or interfacial layer may be a porous polymer layer filled with liquid electrolyte. In some embodiments, the cathode interface or interfacial layer may be a porous polymer layer filled with liquid, gel or polymer electrolyte.

15 Claims, 9 Drawing Sheets

(51) Int. Cl.
  *H01M 4/38* (2006.01)
  *H01M 4/58* (2010.01)
  *H01M 10/052* (2010.01)
  *H01M 10/056* (2010.01)
  *H01M 10/0562* (2010.01)
  *H01M 50/409* (2021.01)
  *H01M 50/414* (2021.01)
  *H01M 50/431* (2021.01)
  *H01M 50/446* (2021.01)
  *H01M 50/449* (2021.01)
  *H01M 50/46* (2021.01)

(52) U.S. Cl.
  CPC ......... *H01M 4/582* (2013.01); *H01M 10/052* (2013.01); *H01M 10/056* (2013.01); *H01M 10/0562* (2013.01); *H01M 50/409* (2021.01); *H01M 50/414* (2021.01); *H01M 50/431* (2021.01); *H01M 50/446* (2021.01); *H01M 50/449* (2021.01); *H01M 50/46* (2021.01); *H01M 2300/0082* (2013.01); *H01M 2300/0094* (2013.01)

(56) References Cited

U.S. PATENT DOCUMENTS

| | | | |
|---|---|---|---|
| 5,360,686 | A | 11/1994 | Peled et al. |
| 5,935,483 | A | 8/1999 | Kong |
| 8,649,939 | B2 | 2/2014 | Yoshimura et al. |
| 9,455,430 | B2 | 9/2016 | Huang et al. |
| 2005/0255769 | A1 | 11/2005 | Hennige et al. |
| 2006/0166085 | A1 | 7/2006 | Hennige et al. |
| 2007/0082261 | A1 | 4/2007 | Lee |
| 2007/0172739 | A1 | 7/2007 | Visco et al. |
| 2007/0281206 | A1 | 12/2007 | Fujakawa et al. |
| 2009/0092898 | A1 | 4/2009 | Han |
| 2009/0092903 | A1 | 4/2009 | Johnson et al. |
| 2012/0107667 | A1 | 5/2012 | Jeong et al. |
| 2015/0056493 | A1* | 2/2015 | Dadheech ........... H01M 4/1391 429/231.1 |
| 2016/0261002 | A1 | 9/2016 | Trevey et al. |
| 2017/0025716 | A1* | 1/2017 | Suzuki ................ H01M 50/451 |
| 2017/0162901 | A1 | 6/2017 | Chen et al. |
| 2017/0179532 | A1* | 6/2017 | Archer ................ H01M 10/052 |
| 2017/0338522 | A1 | 11/2017 | Hu et al. |
| 2018/0016144 | A1 | 1/2018 | Yang et al. |
| 2018/0166743 | A1* | 6/2018 | Lee ..................... H01M 10/052 |
| 2019/0036120 | A1* | 1/2019 | Kornbluth ......... C23C 16/45525 |
| 2019/0058177 | A1* | 2/2019 | Herle ...................... H01G 9/02 |
| 2020/0112050 | A1* | 4/2020 | Hu .................... H01M 10/0525 |

OTHER PUBLICATIONS

Sun, Chunwen et al. "Recent Advances in All-Solid-State Rechargeable Lithium Batteries" Nano Energy 33 (2017) pp. 363-386.
Pandey, G.P. et al., "Solid polymer electrolytes: Materials designing and all-solid-state battery applications: An overview" J. Phys. D: Appl. Phys. 41 (2008) 223001 (18 pgs.).
Arora, P. et al., "Battery Separators", Chem. Rev, 104, pp. 4441-4442.
Zhang, S, "A Review of the Separators of Liquid Electrolyte Li-ion Batteries", J. Power Sources 164 (2007) (pp. 351-361).
EP Extended Search Report dated Nov. 25, 2021, from EP counterpart Application No. 19780726.6.

* cited by examiner

SOLID STATE BATTERIES, SSE BATTERIES, LITHIUM METAL BATTERIES WITH SOLID STATE ELECTROLYTES, HSSE, SEPARATORS, AND/OR COATINGS, AND/OR RELATED METHODS

CROSS-REFERENCE TO RELATED APPLICATIONS

This application is a 371 Application which claims priority to PCT/US2019/025795, filed Apr. 4, 2019, which claims priority to U.S. Provisional Application Ser. No. 62/653,603, filed Apr. 6, 2018, hereby fully incorporated by reference herein.

FIELD

In accordance with at least certain inventive embodiments herein, the problems or issues faced by typical larger SSE batteries are solved by providing an interface or interfacial layer at least between the anode, which comprises Li or Na, and the solid state electrolyte (SSE). In some other embodiments, an interfacial layer may be provided between the anode, which comprises Li or Na, and the SSE, and an interface or interfacial layer may also be provided between the cathode and the SSE. In at least selected embodiments, aspects or objects, the interfacial layer may act as a shock absorber between a SSE (e.g., a sulfide glass SSE) and an anode material that is soft compared to the SSE (e.g., Li metal). In other embodiments, the interfacial layer may act as a shock absorber between the SSE and a cathode material that is softer than the SSE. In at least certain embodiments, the interfacial layer may improve ionic conductance between the anode and the SSE and/or the SSE and the cathode. In at least certain selected embodiments, the interfacial layer may prevent or deter lithium deposition and dendrite growth at the interface between the anode and the SSE. Interface defects at the interface between the anode and the SSE may allow lithium deposition and dendrite growth. The dendrites may continue to grow through cracks in the SSE causing a short, which is a safety issue. The inventive interfacial layer between the anode and the SSE may prevent or deter this. In at least some embodiments, the interfacial layer may be a porous polymer layer filled with liquid electrolyte and may improve ionic conductance between the anode and the SSE and/or the SSE and the cathode. In certain embodiments, the anode interface or interfacial layer may be a porous polymer layer filled with liquid electrolyte. In some embodiments, the cathode interface or interfacial layer may be a porous polymer layer filled with liquid, gel or polymer electrolyte. In other embodiments, the anode interface or interfacial layer may be a porous Li Halide layer. In some embodiments, the anode interface or interfacial layer may be a porous Li Halide or Li Iodide layer and the cathode interface or interfacial layer may be a porous polymer layer filled with liquid, gel or polymer electrolyte. In still other embodiments, the anode interface or interfacial layer may be a porous Li Halide or Li Iodide layer with an optional microporous polymer layer filled with liquid, gel or polymer electrolyte, and the cathode interface or interfacial layer may be a microporous polymer layer filled with liquid, gel or polymer electrolyte. In some possibly preferred embodiments, the interfacial layer or layers may serve as a shock absorber (may accommodate changes in volume of one or both electrodes) and/or may improve ionic conductance between the anode and the SSE and/or the SSE and the cathode.

BACKGROUND

Motive power sources (e.g., batteries) are important for the development of many different devices (for example, handheld electronic devices, portable computers, other electronic devices/equipment, hybrid vehicles, and electric vehicles).

The lithium (Li) battery, particularly the lithium secondary battery, is a very important battery because it is lightweight and has a high energy capacity. Such Li batteries generally include: an intercalated Li graphite as the anode; a lithiated cobalt oxide (e.g., $Li_2CoO_2$) as a cathode; liquid electrolyte; and a microporous polymer membrane as the separator.

Over the about 30 years of commercial development of the Li battery (first primary Li batteries, then secondary Li batteries), the capacity of the Li battery has steadily increased, yet surprisingly, the best anode, cathode, electrolyte, and separator materials have remained basically the same, with the exception of the ceramic coated separator (see U.S. Pat. No. 6,432,586 hereby fully incorporated by reference) as compared to uncoated polymer membrane separators. The capacity improvements have been mainly achieved by reducing inert materials in the Li battery, so that active materials may be increased. The introduction of the ceramic coated separator by Zhengming (John) Zhang of Celgard, LLC, the present inventor, allowed separator thickness to be reduced and energy density to be increased.

Li solid state electrolyte (SSE) batteries have some known issues. For example, most of the elastic SSEs may react with a Li metal anode to form very resistive layers at the interface of the anode and the SSE. This is illustrated in FIG. 8.

For crystal or glassy SSEs, even the cathode-SSE interface can become a problem. With crystal or crystalline SSEs, even more problems occur, especially if the anode or cathode are made of a softer material than the crystalline SSEs. The crystalline or glassy SSEs may damage the anode or cathode material, which is particularly problematic when the anode is made of soft and reactive lithium (Li) metal.

Another issue is potential Li deposition at the interface of an SSE and lithium metal, which may lead to dendrites and soft or hard shorts in the battery. An exemplary SSE is shown in FIG. 9.

Some working small coin cell lithium metal solid state (or solid-state) batteries have been formed, but not larger high density electric drive vehicle (EDV) SSE type batteries. Some have predicted success based on such small coin cell performance, but successful higher density, larger EDV SSE batteries have not actually been made. Smaller cells (e.g., coin cells) perform better than bigger cells because they can much more easily handle changes in volume of the electrodes during cycling. Also, more conductor or electrolyte can be added in smaller cells.

SUMMARY

At least selected embodiments or inventions described herein may address or solve one or more of the problems or issues associated with current Li-metal, Na-metal, Li-ion, or Na-ion primary or secondary batteries having a solid state electrolyte (Li or Na SSE batteries). A solid state electrolyte (SSE), is understood by one skilled in the art, as being a solid or glassy material that moves or conducts Li or Na ions (without liquid electrolyte). In accordance with at least certain inventive embodiments herein, the problems or issues faced by typical larger SSE batteries are solved by providing an interface or interfacial layer at least between the anode, which comprises Li or Na, and the solid state electrolyte (SSE). In some other embodiments, an interfacial layer may be provided between the anode, which comprises Li or Na, and the SSE, and an interface or interfacial layer may also be provided between the cathode and the SSE.

In at least selected embodiments, aspects or objects, the interfacial layer may act as a shock absorber between a SSE (e.g., a sulfide glass SSE) and an anode material that is soft compared to the SSE (e.g., Li metal). In other embodiments, the interfacial layer may act as a shock absorber between the SSE and a cathode material that is softer than the SSE. In at least certain embodiments, the interfacial layer may improve ionic conductance between the anode and the SSE and/or the SSE and the cathode. In at least certain selected embodiments, the interfacial layer may prevent or deter lithium deposition and dendrite growth at the interface between the anode and the SSE. Interface defects at the interface between the anode and the SSE may allow lithium deposition and dendrite growth. The dendrites may continue to grow through cracks in the SSE causing a short, which is a safety issue. The inventive interfacial layer between the anode and the SSE may prevent or deter this. In at least some embodiments, the interfacial layer may be a porous polymer layer filled with liquid electrolyte and may improve ionic conductance between the anode and the SSE and/or the SSE and the cathode. In certain embodiments, the anode interface or interfacial layer may be a porous polymer layer filled with liquid electrolyte. In some embodiments, the cathode interface or interfacial layer may be a porous polymer layer filled with liquid, gel or polymer electrolyte. In other embodiments, the anode interface or interfacial layer may be a porous Li Halide layer. In some embodiments, the anode interface or interfacial layer may be a porous Li Halide or Li Iodide layer and the cathode interface or interfacial layer may be a porous polymer layer filled with liquid, gel or polymer electrolyte. In still other embodiments, the anode interface or interfacial layer may be a porous Li Halide or Li Iodide layer with an optional microporous polymer layer filled with liquid, gel or polymer electrolyte, and the cathode interface or interfacial layer may be a microporous polymer layer filled with liquid, gel or polymer electrolyte. In some possibly preferred embodiments, the interfacial layer or layers may serve as a shock absorber (may accommodate changes in volume of one or both electrodes) and/or may improve ionic conductance between the anode and the SSE and/or the SSE and the cathode.

In at least one possibly preferred aspect or embodiment, an improved solid state electrolyte (SSE) battery is disclosed. The SSE battery may include, in the following order: a lithium metal or sodium metal containing anode; a hybrid solid state electrolyte (HSSE); and a cathode. The HSSE may include, in the following order, an anode interface layer, an SSE layer, and an optional cathode interface layer.

In some embodiments, the lithium-metal-containing anode is made up of at least one selected from the group consisting of lithium metal, $LiC_6$, $Li_{22}Si_5$, $Li_{15}Si_4$, $Li_{22}Sn_5$, LiAl, $Li_{22}Pb_5$, Li/graphene, Li/Cu, Li/Si, Li/Sn, Li+ transition metal, or combinations thereof. The lithium metal or sodium metal containing anode may also be made up of only lithium metal in some embodiments. In some other embodiments, the lithium metal or sodium metal containing anode is made up at least one selected from the group consisting of sodium metal and $Na/C_6$. In still other embodiments, the lithium metal or sodium metal containing anode may be made up of an alloy.

The cathode of the improved solid state electrolyte battery (Na or Li SSE Battery) may be made up of lithium sulfide, a lithium cobalt based alloy, a lithium iron based alloy, Li sulfur, Sulfur, Air, or $O_2$. In some embodiments, the cathode is made up of Li Sulfur (Li—S), Sodium Sulfur (NaS), or $NaCoO_2$.

The anode interface layer has, in some possibly preferred embodiments, at least one of the following properties: it is softer than the SSE, it conducts ions, particularly sodium or lithium ions, and it is electrically insulative. In some embodiments, the anode interface layer has all of the foregoing properties. Examples of an anode and SSE interface layer in some embodiments include a layer that is made up of a lithium or sodium halide (e.g., lithium iodide); a porous or microporous polymer film or membrane with liquid, gel, or polymer electrolyte; a polymer layer with a liquid, gel, or polymer electrolyte (such as PEO, PI, PAI, PVDF, or PVDF: HFP); or a ceramic layer with a liquid, gel, or polymer electrolyte (with an optional polymer binder, such as PEO, PVDF, or PVDF:HFP). The anode interface layer may be provided on at least one of: a surface of the anode, a surface of the SSE, or both a surface of the SSE and a surface of the anode.

In the improved SSE battery described in at least certain embodiments herein, the possibly preferred SSE is at least one selected from the group consisting of an inorganic glassy or ceramic SSE, a polymeric SSE, or a combination SSE comprising a polymer and an inorganic glassy or ceramic material.

In embodiments where a cathode and SSE interface layer is present, the cathode interface layer may be provided on at least one of: a surface of the cathode, a surface of the SSE, or both a surface of the cathode and a surface of the SSE.

In another aspect or embodiment, a vehicle, storage system, or device comprising the improved SSE battery described herein is provided or described.

In yet another aspect or embodiment, a hybrid solid state electrolyte (HSSE) is disclosed herein. The HSSE may be used in the improved SSE battery described herein. The HSSE may comprise, in the following order: an anode interface layer, a solid state electrolyte (SSE) and an optionally provided cathode interface layer. In some embodiments, the optional cathode interface layer is present, and in other embodiments it is not.

In some embodiments, the anode interface layer is provided directly on a surface of the SSE. Also, in some embodiments where the optional cathode interface layer is used, it can be provided directly on a surface of the SSE that is opposite to a surface that the anode interface is provided on (or provided directly on).

The SSE of the HSSE described herein may be at least one selected from the group consisting of an inorganic glassy or ceramic SSE, a polymeric SSE, or a combination SSE comprising a polymer and an inorganic glassy or ceramic material.

The anode interface layer of the HSSE may be at least one selected from the group consisting of a lithium or sodium halide film (e.g., a lithium halide film); a porous or microporous polymer film or membrane with liquid, gel, or polymer electrolyte therein; a polymer film with liquid, gel, or polymer electrolyte; or a ceramic layer with a liquid, gel, or polymer electrolyte.

In another aspect, a new or improved solid state battery comprising the HSSE described herein above is provided or described (a HSSE Battery).

In still another aspect, a vehicle, storage system, or device comprising the solid-state battery comprising the HSSE described herein is provided or described.

In another aspect, a method of making a hybrid solid state electrolyte (HSSE) is described herein. The method comprises at least a step of forming an anode interface layer on at least one side of a solid state electrolyte. Sometimes, the anode interface layer may be provided directly onto a surface of the SSE and sometimes it is not. In some embodiments, the method comprises the additional step of forming a cathode interface layer on a side of the SSE opposite to the side the anode layer is on or is to be formed on. Sometimes, the cathode interface layer is formed directly onto the SSE and sometimes it is not. If the respective anode and cathode interface layers and the SSE are in cut pieces, they can be stacked in HSSE production or in cell or battery production. If the respective anode and cathode interface layers and the SSE are in roll form, they can be laminated in HSSE production or in cell or battery production.

The anode interface layer of the method may be at least one selected from the group consisting of: a lithium or sodium halide film (e.g., a lithium iodide film); a polymer film with liquid, gel, or polymer electrolyte; a porous or microporous polymer film or membrane with liquid, gel, or polymer electrolyte therein; or a ceramic layer with a liquid, gel, or polymer electrolyte.

The SSE of the method may be at least one selected from the group consisting of an inorganic, glassy, or ceramic SSE, a polymeric SSE, or a combination SSE comprising a polymer and an inorganic, glassy, or ceramic material.

In some preferred embodiments, the SSE is an inorganic, glassy, or ceramic SSE and the anode interface film is at least one selected from the group consisting of a lithium or sodium halide film (e.g., a lithium iodide film); a polymer film with liquid, gel, or polymer electrolyte; a thin microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention); or a ceramic layer with a liquid, gel, or polymer electrolyte.

In another aspect, a method for making an improved solid state battery is described herein. The method comprises at least a step of forming an anode interface layer on at least one of the following: a side of a solid state electrolyte (SSE); a side of an anode that will be facing the SSE in the solid state battery; and both a side of an SSE and a side of an anode, wherein the side of the SSE and the side of the anode are facing each other in the solid state battery. In some embodiments, the anode interface layer is formed directly on the anode or directly on the SSE.

In another aspect, a method for making an improved solid state battery is described herein. The method comprises at least a step of forming a cathode interface layer on at least one of the following: a side of a solid state electrolyte (SSE); a side of a cathode that will be facing the SSE in the solid state battery; and both a side of an SSE and a side of a cathode, wherein the side of the SSE and the side of the cathode are facing each other in the solid state battery. In some embodiments, the cathode interface layer is formed directly on the cathode or directly on the SSE.

In another aspect, a method for making an improved solid state battery is described herein. The method comprises a step of forming an anode interface layer, and an additional step of forming a cathode interface layer is included in the method for making an improved solid state battery. In such embodiments, a cathode interface layer is formed on at least one of the following: a side of the SSE that is opposite to the side of the SSE that the anode interface layer is or will be formed on; a side of cathode that will be facing the SSE in the solid state battery, and both the side of the SSE that is opposite to the side of the SSE that the anode interface layer is or will be formed on and on the side of the cathode that will be facing the SSE in the solid state battery. In some embodiments, the cathode interface layer is formed directly on the SSE or directly on the cathode.

The anode interface layer used in this method may be at least one selected from the group consisting of: a lithium or sodium halide film (e.g., lithium iodide), a polymer film with liquid, gel, or polymer electrolyte, a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention), and a ceramic layer with a liquid, gel, or polymer electrolyte.

The SSE used in this method may be, in some embodiments, at least one selected from the group consisting of an inorganic, glassy, or ceramic SSE, a polymeric SSE, or a combination SSE comprising a polymer and an inorganic, glassy, or ceramic material.

In some preferred embodiments, the SSE is an inorganic, glassy, or ceramic SSE and the anode interface layer is at least one selected from the group consisting of: a lithium or sodium halide film (e.g., lithium iodide), a polymer film or layer with liquid, gel, or polymer electrolyte, a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention), and a ceramic layer with a liquid, gel, or polymer electrolyte.

In some other preferred embodiments, the SSE is an inorganic, glassy, or ceramic SSE and the cathode interface layer is at least one selected from the group consisting of: a lithium or sodium halide film (e.g., lithium iodide), a polymer film or layer with liquid, gel, or polymer electrolyte, a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention), and a ceramic layer with a liquid, gel, or polymer electrolyte.

In still other preferred embodiments, the SSE is an inorganic, glassy, or ceramic SSE and the anode and cathode interface layers are each at least one selected from the group consisting of: a lithium or sodium halide film (e.g., lithium iodide), a polymer film or layer with liquid, gel, or polymer electrolyte, a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention), and a ceramic layer with a liquid, gel, or polymer electrolyte.

In a possibly more preferred embodiment, the SSE is an inorganic, glassy, or ceramic SSE and the anode interface layer is or layers are each at least one selected from the group consisting of: a lithium or sodium halide film (e.g., lithium iodide), and a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention).

In a possibly more preferred embodiment, the SSE is an inorganic, glassy, or ceramic SSE and the anode interface layer and an optional cathode interface layer are each at least one selected from the group consisting of: a lithium or sodium halide film (e.g., lithium iodide), and a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention).

In a possibly preferred embodiment, the SSE is an inorganic, glassy, or ceramic SSE and the anode and/or cathode interface layers are each at least one selected from the group consisting of: a porous or microporous polymer film or membrane with liquid, gel, or polymer electrolyte therein (preferably a Celgard® dry process polyolefin microporous polymer film or membrane with a liquid electrolyte for good or improved ionic conduction, good or improved resilience, and good or improved dendrite prevention), and a ceramic or polymer layer with a liquid, gel, or polymer electrolyte.

Accordingly, the following new or improved batteries are proposed:

Accordingly, the following new or improved Li Metal Battery is proposed:
 A battery comprises:
 a lithium metal anode;
 a cathode; and,
 a hybrid solid state electrolyte (HSSE) between the anode and the cathode including:
  a cathode interface layer,
  a solid state electrolyte (SSE) layer, and
  an anode interface layer.
These elements are described in greater detail below.

Accordingly, the following new or improved Li Metal Solid State Battery is proposed:
 A battery comprises:
 a lithium metal anode;
 a cathode; and,
 a hybrid solid state electrolyte (HSSE) between the anode and the cathode including:
  a cathode interface layer,
  a solid state electrolyte (SSE), and
  an anode interface layer.
These elements are described in greater detail below.

Accordingly, the following new or improved Solid State Battery is proposed:
 A battery comprises:
 an anode, such as a lithium metal or sodium metal anode, preferably a lithium metal anode;
 a cathode, such as a Li Sulfur, sodium sulfur, or Li Cobalt cathode; and,
 a hybrid solid state electrolyte (HSSE) between the anode and the cathode including:
  an optional cathode interface layer,
  a solid state electrolyte (SSE), and
  an optional anode interface layer.
These elements are described in greater detail below.

Accordingly, the following new or improved Solid State Battery is proposed:
 A battery comprises:
 an anode, preferably a lithium metal anode;
 a cathode, such as a Li Sulfur, sodium sulfur, or Li Cobalt cathode; and,
 a hybrid solid state electrolyte (HSSE) between the anode and the cathode including:
  an optional cathode interface layer,
  a solid state electrolyte (SSE), and
  an anode interface layer.
These elements are described in greater detail below.

Accordingly, the following new or improved Solid State Battery is proposed:
 A battery comprises:
 an anode, preferably a lithium metal anode;
 a cathode, such as a Li Sulfur, sodium sulfur, or Li Cobalt cathode; and,
 a hybrid solid state electrolyte (HSSE) between the anode and the cathode including:
  a cathode interface layer,
  a solid state electrolyte (SSE), and
  an optional anode interface layer.
These elements are described in greater detail below.

The use of Li metal for the anode in the lithium or solid state Li battery is one preferred alternative. The use of Li metal is not new, but Li metal is not used because of the historical issues and concerns about its use.

The use of a Li Sulfur cathode in the battery is one preferred alternative. The removal of cobalt from the cathode would be a welcome improvement because the price of cobalt is currently on the increase due to demand and because Sulfur provides higher energy.

Accordingly, the following new battery options are proposed:
 A battery comprises:
 an anode, preferably a lithium metal anode;
 a cathode, preferably a Li Cobalt or Li Sulfur cathode; and,
 a hybrid solid state electrolyte (HSSE) between the anode and the cathode including:
  an optional cathode interface layer or layers,
  a solid state electrolyte (SSE), and
  an optional anode interface layer or layers.

DETAILED DESCRIPTION

Figure 1:
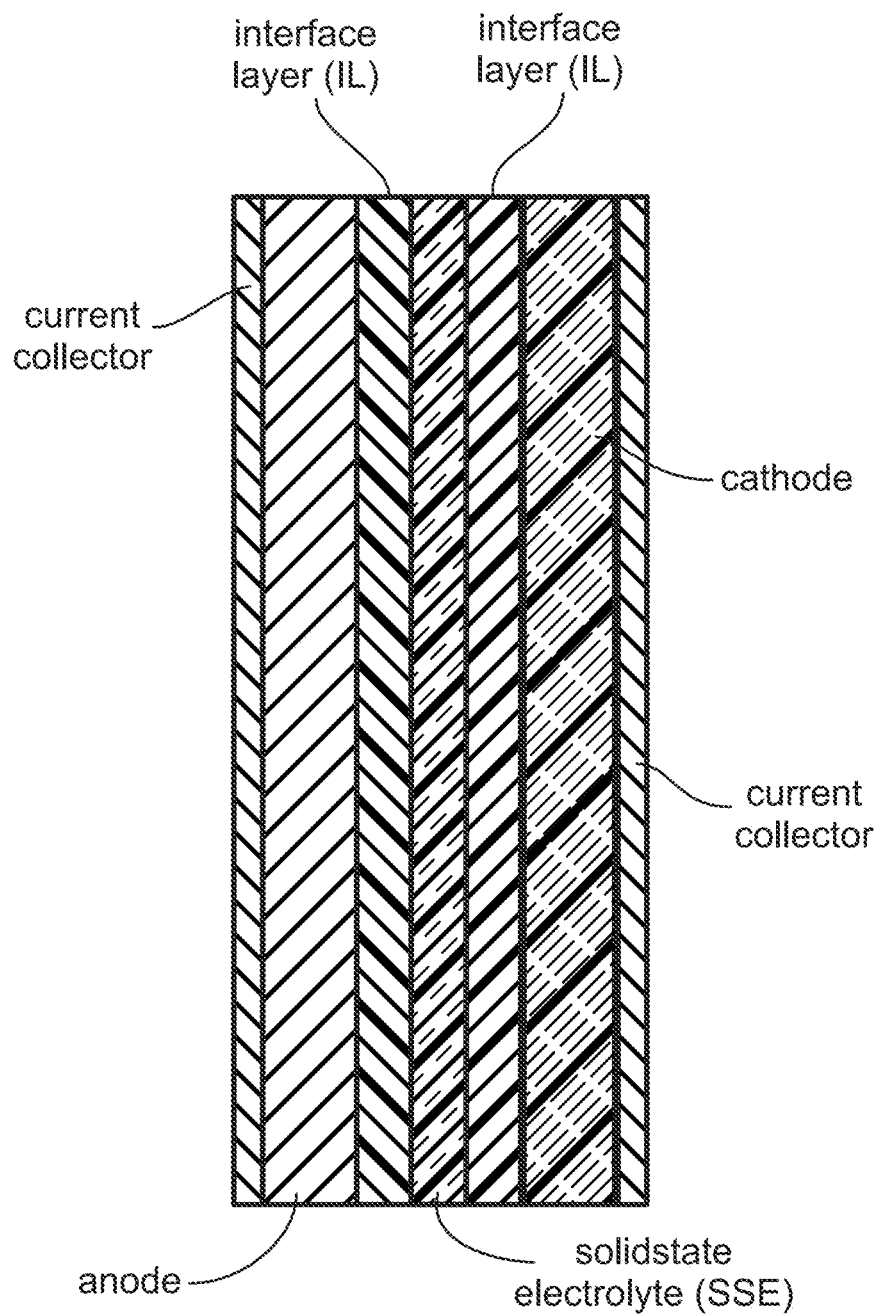
FIG. 1 is a sectional side view of a battery according to a first embodiment of the invention.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Disclosed herein is an improved solid state electrolyte (SSE) battery (such as a lithium or sodium SSE battery) comprising a hybrid solid state electrolyte (HSSE), the HSSE itself, vehicles, storage systems, and devices comprising the improved solid state electrolyte battery and the HSSE, batteries comprising the HSSE, methods for manufacturing the HSSE, and methods for manufacturing the improved solid state electrolyte battery comprising the HSSE.

Some aims of this disclosure are to address past issues with solid state batteries and/or SSEs, to protect the SSE, anode, and/or cathode, to provide a practical, long cycle life, and/or constant charge battery, such as a Li metal battery, Li metal solid state battery, SSE battery, or HSSE battery, and/or to provide a novel or improved anode, SSE, anode+SSE, modified anode, anode+Li Iodide layer, SSE+Li Iodide layer, HSSE, and/or the like, and/or combinations thereof, and it may be beneficial to include: an ion conductive cathode interface layer and/or an ion conductive anode interface layer between the SSE and the appropriate electrode(s), to protect the SSE, anode, and/or cathode, to enhance ion conductivity, to prevent or inhibit dendrite growth, to improve battery safety, and combinations thereof. In general, the interface layer may be at least one of the following: nothing (i.e., the SSE is in direct contact with one or both the electrodes); and/or a polymer skin (e.g., a coating) or film (such as a polyolefin (PO) membrane or layer) with or without a liquid, gel or polymer electrolyte; and/or a ceramic layer with or without a film base. The coating or film (including the film base) may be a polymer based material. Such polymers include, for example, polyolefins (e.g., PE, PP), polyamdies (e.g., nylons), or polyesters (e.g., PET). The polymer skin and film (including the film base) may be nonporous, porous, or microporous. The electrolyte may be impregnated throughout the polymer skin or film (including the film base). In one embodiment the ceramic may include aluminum oxide ($Al_2O_3$), Li Iodide, a Li Halide, and/or the like. The interface layer may be applied to either the SSE and/or the electrode in any conventional manner (depending upon the nature of the SSE and the interface layer, including, for example, stacking, lamination, coating, or vapor deposition to name a few).

Additionally, a lithium halide may be coated on a surface of one or both of the electrodes, the SSE, the HSSE, and/or combinations thereof. In one embodiment, the lithium halide is preferably lithium iodide (LiI).

Solid-State Electrolyte (SSE) Battery

The solid-state electrolyte battery described herein is not so limited and may be comprise, consist of, or consist essentially of, in the following order, an anode, a hybrid solid state electrolyte (HSSE) as described herein, and a cathode. In some embodiments, the solid-state electrolyte battery described herein may comprise, consist of, or consist essentially of, in the following order, a current collector, an anode, an HSSE (optionally preferably with liquid, gel or polymer electrolyte in one or more interface layers), a cathode, and a current collector. Further the solid-state electrolyte battery may comprise, consist of, or consist essentially of the foregoing components and any additional components. The solid state electrolyte battery may be a cylindrical battery or cell, a coin battery or cell, a button battery or cell, a prismatic battery or cell, a stacked battery or cell, or a pouch battery or cell. In some preferred embodiments, the solid state electrolyte battery may be a large or big format cell, i.e., not a button battery or cell or a coin battery or cell. Some effective small format lithium metal batteries have been created, but formation of safe and stable large format cells (such as EDV, ESS, or the like) has been elusive.

A battery according to some embodiments, described herein is shown in the FIG. 1.

Figure 2:
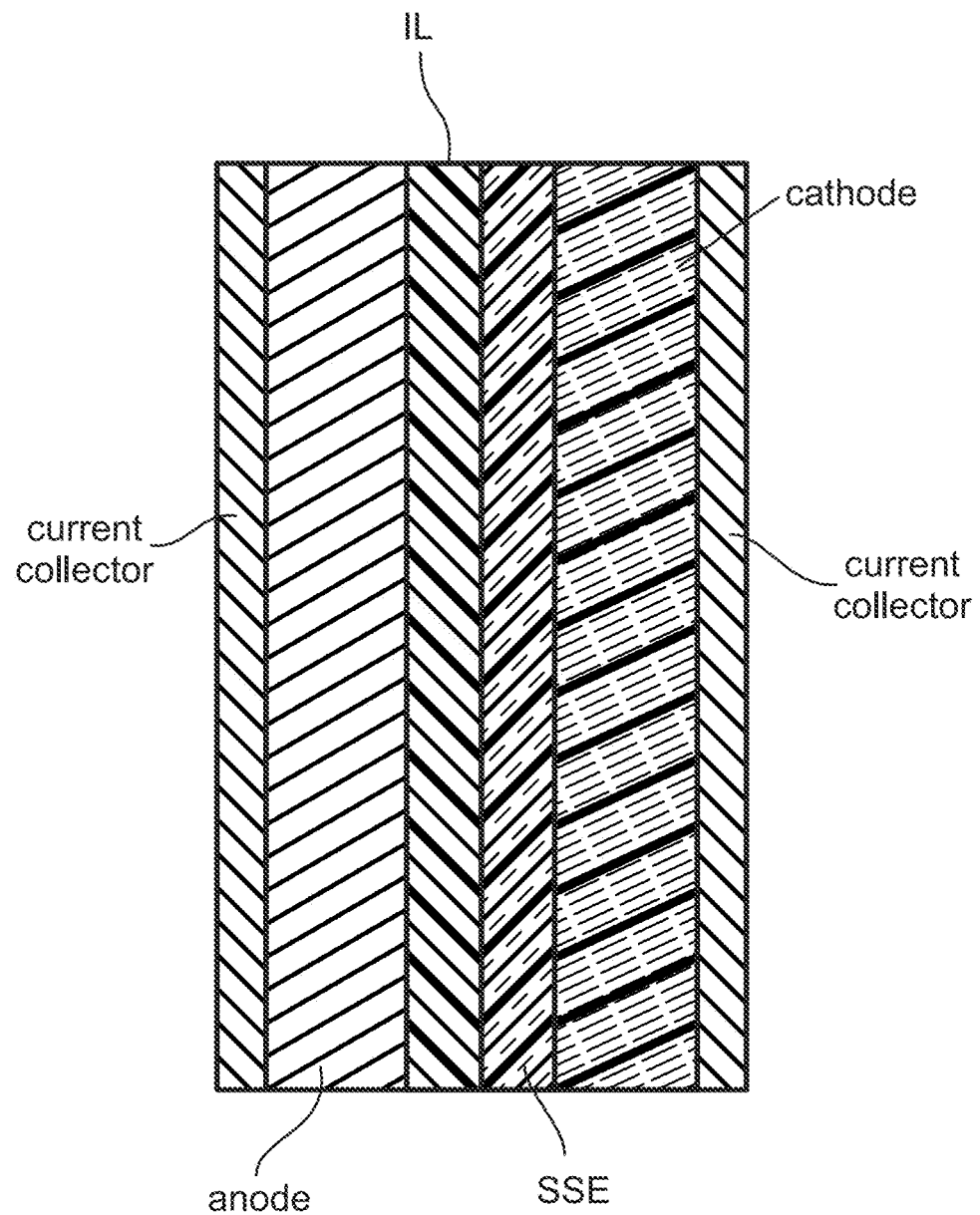
FIG. 2 is a sectional side view of a battery according to a second embodiment of the invention.

A battery according to some other embodiments described herein is shown in FIG. 2.

Figure 3:
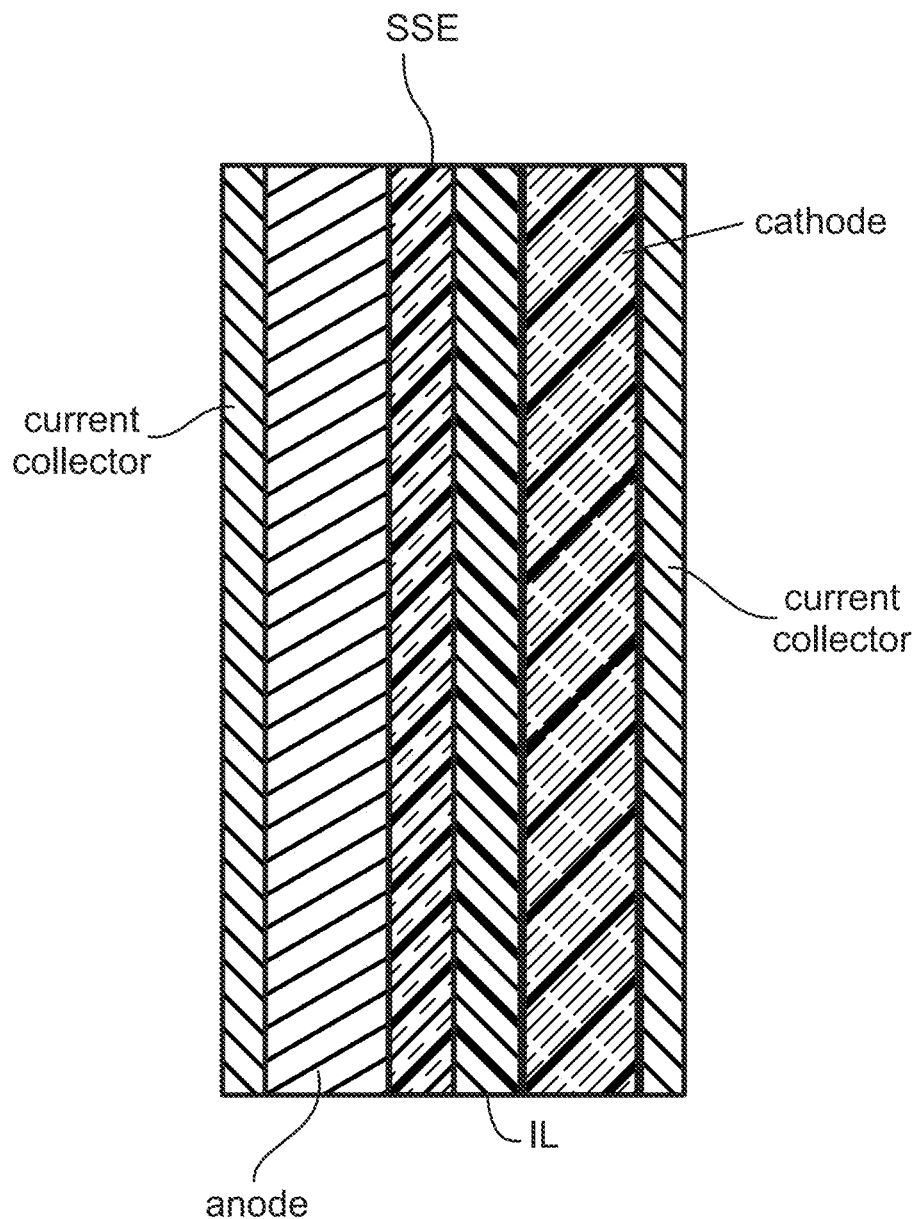
FIG. 3 is a sectional side view of a battery according to a third embodiment of the invention.

A battery according to some other embodiments described herein is shown in FIG. 3.

Figure 4:
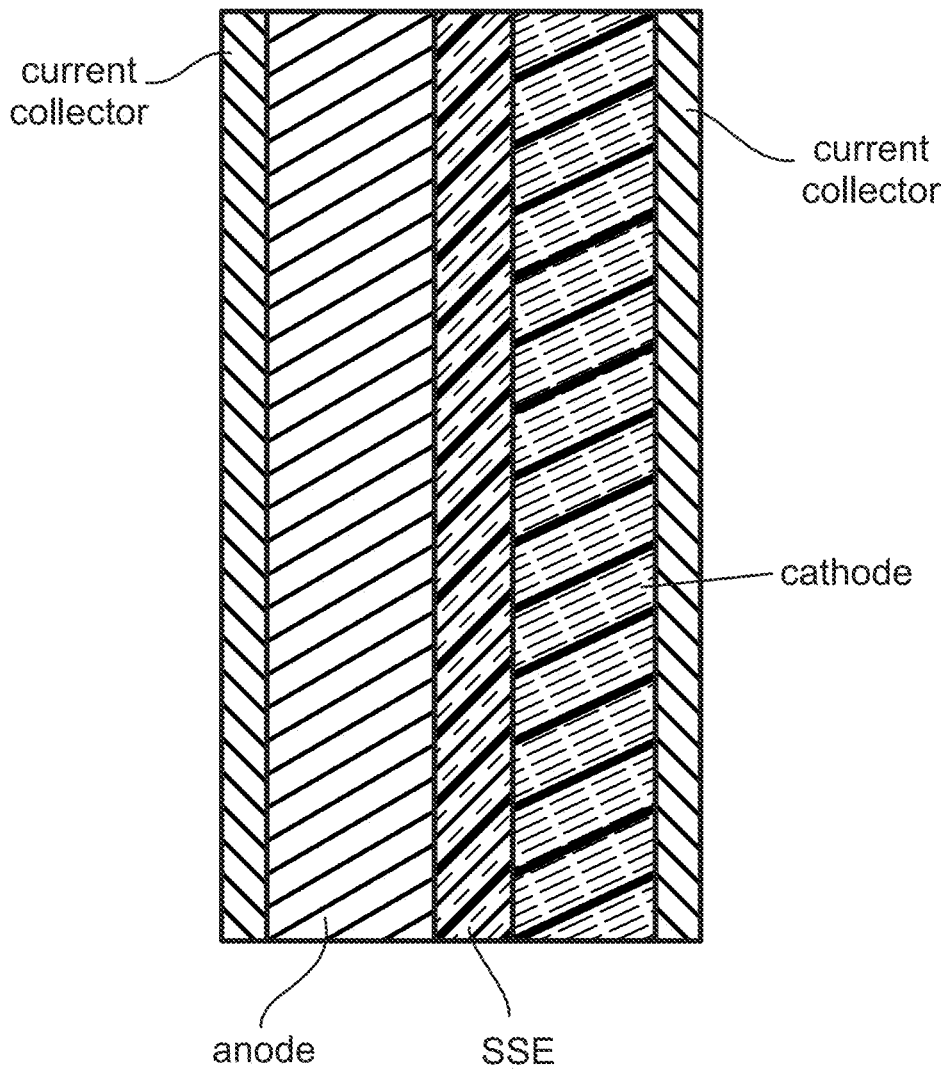
FIG. 4 is a sectional side view of a battery according to a fourth embodiment of the invention.

A battery according to some other embodiments described herein is shown in FIG. 4.

Figure 5:
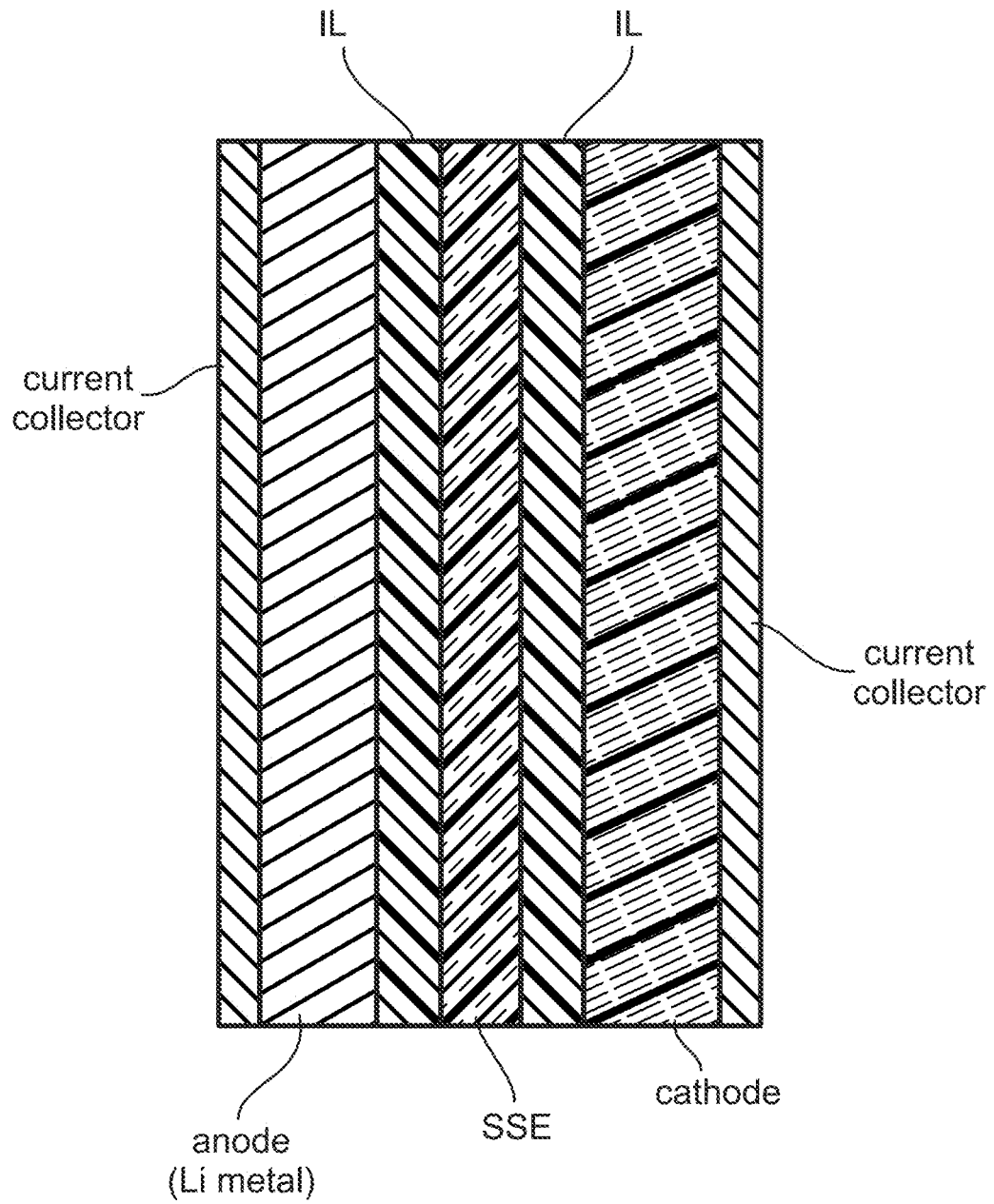
FIG. 5 is a sectional side view of a battery according to a fifth embodiment of the invention.

A battery according to some other embodiments described herein is shown in FIG. 5.

Anode

The anode described herein is not so limited and may be made of any material known to be or later found to be acceptable for use as an anode material.

In some preferred embodiments described herein, the anode may be made of a lithium-metal-containing or sodium-metal-containing material. The anode may comprise, consist of, or consist essentially of the lithium-metal-containing or sodium-metal-containing material. The lithium-metal-containing material may be lithium metal by itself or any alloy comprising lithium. Lithium metal refers to Li metal and not intercalated compound anodes. Examples of alloys comprising lithium include, but are not limited to, $LiC_6$, $Li_{22}Si_5$, $Li_{15}Si_4$, $Li_{22}Sn_5$, LiAl, $Li_{22}Pb_5$, Li/graphene, Li/Cu, Li/Si, Li/Sn, and Li+transition metal. The anode may also comprise, consist of, or consist essentially of a mixture of lithium metal alloys or a mixture of lithium metal with one or more lithium metal alloys. The sodium-containing-metal material may be sodium itself or an alloy comprising sodium. An example of an alloy comprising sodium includes, but is not limited to, $Na/C_6$. The anode may comprise, consist of, or consist essentially of sodium metal itself, a combination of sodium metal and one or more sodium containing alloys, a sodium containing alloy itself, or a mixture of two or more sodium-containing alloys.

In some other preferred embodiments, the anode is made up of or comprises, consists of, or consists essentially of a soft material. The term "soft material" here is understood to mean a material as soft as or softer than lithium metal or sodium metal. A soft material is one that may be damaged by a solid state electrolyte, particularly an inorganic, glassy or ceramic SSE, when placed in direct contact with the soft anode in a typical solid-state electrolyte battery that does not comprise the anode interface layer or layers described herein. Lithium metal and other materials that are as soft as lithium or softer can be damaged by interaction with an SSE in a typical SSE battery. This damage may include removal of pieces of the anode by the SSE, and due to the reactive nature of lithium, this can be dangerous. Smaller pieces of lithium metal means increased surface area on which a reaction can occur. Other soft alkali metals are reactive like lithium.

Other possible anode alloys are disclosed below:

| Alloy (Expansion) | mAH/g | mAH/cm3 |
|---|---|---|
| Li (+100%) | 3860 | 2060 |
| $LiC_6$ (+10%) | 370 | 800 |
| All Below are Nano-Structure Composites with C or other | | |
| $Li_{22}Si_5$ (+300%) | 4200 | 10,000 |
| $Li_{15}Si_4$ | 3580 | 8300 |
| $Li_{22}Sn_5$ (+360%) | 990 | 7200 |
| LiAl | 990 | 2700 |
| $Li_{22}Pb_5$ | 570 | 6500 |

Li/Graphene vs. Li/Cu? Huge number of nucleation sites = low current density Li/Si or Li/Sn + Graphene?
Li = nano-Transition Metal, e.g., Co = Carbon Cathode The cathode described herein is also not limited. It may be made of any material known or later found to be an acceptable cathode material. In some embodiments, the cathode may comprise, consist of, or consist essentially of lithium sulfide, a lithium cobalt based alloy, a lithium iron based alloy, Li sulfur, Na Sulfur, Sulfur, Air, $O_2$, or combinations thereof.

The cathode may be any cathode material. In one embodiment, the cathode material may be a lithium cobalt-based cathode active materials (such as NCA, CSG, LMO, LFP, LCO, NMC). In one preferred embodiment, the cathode material may be a lithium sulfur or sulfide system (including or not including cobalt). In another embodiment, the lithium sulfide system may comprise $Li_2S_6$.

Some Lithium and Sodium Anode and Cathode Systems are disclosed below:

| ANODE | CATHODE | ENERGY DENSITY WH/L:WH/Kg THEORETICAL | | WH/L:WH/Kg APPLICATION | |
|---|---|---|---|---|---|
| PbAc/NiCd/NiMeH | | 160/1000 | 100/450 | 60/300 | 35/150 |
| $Li/C_6$ | $LiCoO_2$ | 1800 | 580 | 700 | 300 |
| $Li/C_6$ | $LiFePO_4$ | 1540 | 540 | 220 | 120 |
| Li/Si | $LiCoO_2$ | 1800 | 580 | 730 | 250(350) |
| Li | Sulfur | 2600 | 2500 | 320 | 350 |
| Li | $O_2$ | 8000 | 11,000 | $600^x$ | $800^x$ |
| $Na/C_6$ | $NaCoO_2$ | 1400 | 500 | <Li Ion | ~Same |
| Gasoline ($C_8H_{18}$) | $O_2$ | 9000 | 13,000 | $1800^y$ | $2600^y$ |

$^x$PolyPlus Li-Encapsulation for Lithium/Air Anode
$^y$20% Carnot efficiency

Hybrid Solid-State Electrolyte

The hybrid solid state electrolyte (HSSE) described herein is not so limited. The HSSE, in some preferred embodiments, may comprise, consist of, or consist essentially of an anode interface layer and a solid state electrolyte (SSE) layer in that order. The HSSE, in other embodiments, may comprise, consist of, or consist essentially of a solid state electrolyte (SSE) layer and a cathode interface layer in that order. In other embodiments, the HSSE may comprise, consist of, or consist essentially of an anode interface layer, an SSE layer, and a cathode interface layer, in that order. In a battery, the anode interface layer is positioned between the anode and the SSE and the cathode interface layer is positioned between the cathode and the SSE.

Some functions that may be served by the hybrid solid state electrolyte (HSSE) include the function of a hybrid or composite separator between the anode and the cathode. For example, the HSSE allows for ionic conduction and transport (e.g., of lithium ions) while providing physical separation of the electrodes. In some embodiments, the HSSE may also prevent electrical shorting by blocking, eliminating, preventing, and/or reducing the growth of dendrites. Dendrite growth normally occurs during battery cycling. The HSSE structure may also, in some embodiments, protect the anode, cathode, or both from damage by the SSE, particularly an SSE that is harder than the anode or the cathode. In some embodiments, the HSSE should have a smooth and/or malleable (or elastic) face, at least adjacent, abutting, or contacting the anode, especially a smooth Li metal anode, so that good surface contact (facilitating ion conduction) may be maintained with the electrodes as the electrodes expand and contract during battery cycling (volume change due to Li movement). The HSSE should be stable (e.g., chemically stable) in the battery environment. The HSSE should not react with the electrodes.

Figure 6:
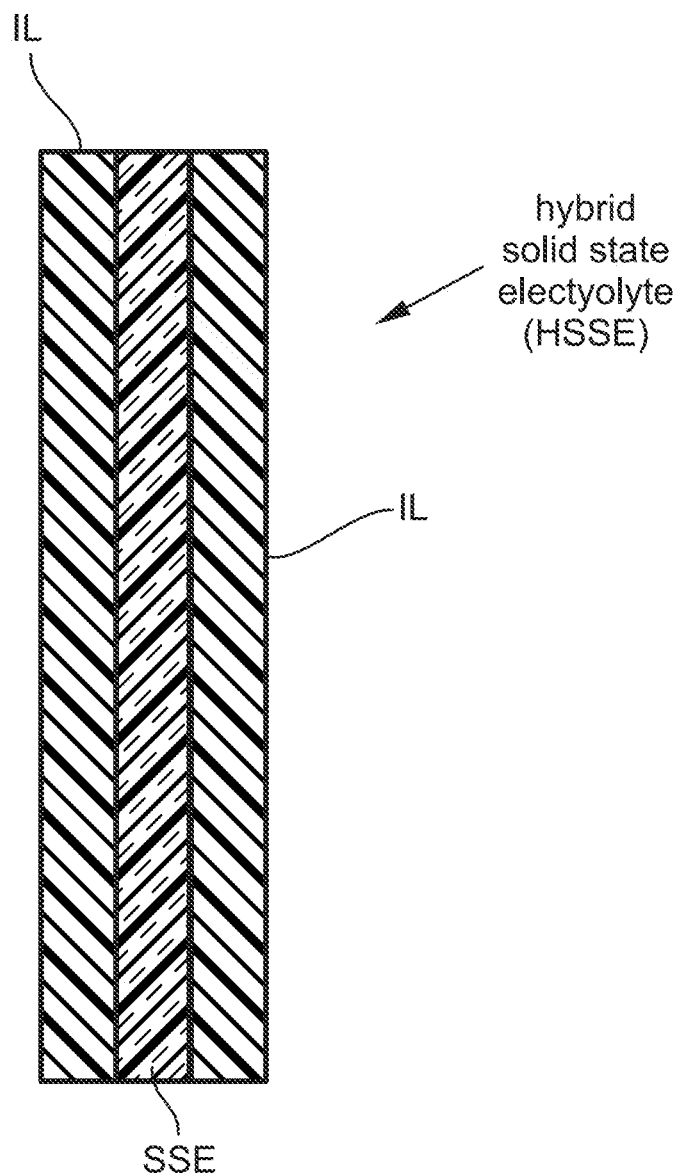
FIG. 6 is a sectional side view of a hybrid solid state electrolyte battery according to some embodiments of the invention.

An HSSE according to some embodiments herein is shown in FIG. 6.

Solid State Electrolyte

The solid state electrolyte (SSE) is not so limited and may be made up of any material known or found to be acceptable for the formation of a solid state electrolyte. Particularly, the solid state electrolyte may be made up of a material known or discovered to be an acceptable solid state electrolyte for a lithium metal, lithium ion, sodium metal, or sodium ion primary or secondary battery.

In some preferred embodiments, the solid state electrolyte may be a polymeric SSE. For example, the polymeric SSE may be any one described in the article Agrawal et al., Solid Polymer Electrolytes Materials Designing and All Solid-State Battery Applications: An Overview, Journal of Physics D. Applied Physics, October 2008, which is incorporated herein by reference in its entirety. As described in the Agrawal et al. article, the polymeric SSE may be a conventional polymer—salt complex or dry solid polymeric electrolyte (SPE), a plasticized polymer—salt complex, a polymer gel electrolyte, a rubbery polymer electrolyte, or a composite polymer electrolyte which comprises micro or nanosize inorganic (ceramic)/organic filler particles dispersed into a conventional SPE host. Solid polymeric electrolytes are also disclosed in Sun et al., *Recent Advances in All-Solid-State Rechargeable Lithium Batteries*, Nano Energy 33(2017) 363-386 which is incorporated herein by reference in its entirety.

Polymeric electrolytes are known to have a problem of having low ionic conductivity at room temperature, which is necessary to produce a marketable battery that will be used at these temperatures. However polymeric electrolyte are generally preferred when it comes to flexibility and safety.

In accordance to some embodiments described herein, the interface layers may help to improve the ionic conductivity of polymeric solid state electrolytes or SPE. In some other embodiments, the interface layers (particularly the anode interface layers) described herein may improve the polymeric solid state electrolytes ability to block, eliminate, prevent, and/or reduce the growth of dendrites.

In some other preferred embodiments, the solid state electrolyte is an inorganic, glassy, or ceramic solid state electrolyte. Some examples of inorganic, glassy, or ceramic solid state electrolytes are described in the article Sun et al., *Recent Advances in All-Solid-State Rechargeable Lithium Batteries*, Nano Energy 33(2017) 363-386 which is incorporated herein by reference in its entirety. Some examples of materials of inorganic, glass, or ceramic solid state electrolytes include Li3N, LiPON, Li2S-based glass, NaSICON-type oxides, Li0.05-3xLa0.5+xTiO3, and Li7La3Zr2O12.

Generally, inorganic, glassy, or ceramic solid state electrolytes provide better ionic conductivity than polymeric solid state electrolytes do and may better block the passage of dendrites. However, these glassy or crystalline SSEs are also more rigid or less flexible than polymeric solid state electrolytes. There is a known problem with inorganic, glassy, or ceramic solid state electrolytes, particularly when used with softer anode or cathode materials, that the inorganic, glassy, or ceramic SSE will damage the anode or cathode materials causing safety issues. In some other embodiments, the interface layers described herein may improve the safety of batteries formed using soft anode or cathode materials (e.g., lithium metal) with an inorganic, glassy, or ceramic SSE.

In some other preferred embodiments, the SSE is a combination SSE comprising polymer material and an inorganic, glassy, or ceramic material. Exemplary materials are disclosed in Sun et al., *Recent Advances in All-Solid-State Rechargeable Lithium Batteries*, Nano Energy 33(2017) 363-386 and Agrawal et al., Solid Polymer Electrolytes Materials Designing and All Solid-State Battery Applications: An Overview, Journal of Physics D. Applied Physics, October 2008. In some other embodiments, the inventive interface layers (particularly the anode interface layers) described herein may improve the polymeric solid state electrolytes ability to block, eliminate, prevent, and/or reduce the growth of dendrites.

Combination SSEs have better conductivity generally than polymeric SSEs, but still lower conductivity than some inorganic, glassy, or ceramic SSEs. The combination SSEs however, are less rigid generally than inorganic, glassy, or ceramic SSEs. In some embodiments, the interface layers described herein may improve the safety of batteries formed using soft anode or cathode materials (e.g., lithium metal) with a combination SSE. In some other embodiments, the interface layers may improve the conductivity of the combination SSE particularly at the interface of the SSE and the anode or the interface of the SSE and the cathode. In some other embodiments, the interface layers (particularly the anode interface layers) described herein may improve the polymeric solid state electrolytes ability to block, eliminate, prevent, and/or reduce the growth of dendrites.

In some embodiments a highly elastic SSE like a sulfide glass (super-cooled liquid) is preferred as the SSE. In other preferred embodiments, the preferred SSE is an isotropic SSE (with 3 dimensional conductivity). In other embodiments, the preferred SSE is an isotropic, strong, and elastic SSE.

Some other SSEs acceptable for use herein are found in the Table from Kerman et al. JES 167(7) A1731-A174A (2017), which is incorporated herein in its entirety.

In other embodiments, the SSE may be any material, but is, in some embodiments, preferably not a polymer or gel electrolyte (as understood by those of ordinary skill, see, for example, Wikipedia—Electrolyte/solid electrolyte, Linden (ed), *Handbook of Batteries*, $2^{nd}$ edition, McGraw-Hill, Inc. 1995, page 36.20 et seq; Besenhard (editor), *Handbook of Battery Materials*, Wiley-VCH, 1999, pages 557 et seq.; Arora/Zhang, *Battery Separators, Chem. Rev,* 104, pages 4441-4442; Zhang, S, *A Review of the Separators of Liquid Electrolyte Li-ion Batteries, J. Power Sources* 164 (2007) page 361). The SSE may be a dry electrolyte (or a dry polymer electrolyte) and/or a solid ceramic electrolyte and/or an organic ionic plastic crystal. Such dry electrolytes usually have high dielectric constants. The dry electrolyte may include, for example: polyethylene oxide (PEO), poly methylmethacrylate (PMMA), polyphosphazenes, and siloxanes. In one preferred embodiment, the dry electrolyte may be PEO. The solid ceramic electrolytes (or glassy-ceramic electrolytes) allow ions to migrate through the ceramic phase by means of vacancies or interstitial spaces or voids within the lattice. Organic ionic plastic crystals may be a type of organic salts exhibiting mesophases (i.e., a state of matter intermediate between liquid and solid), in which mobile ions are orientationally or rotationally disordered while their centers are located at the ordered sites in the crystal structure. These crystals have various forms of disorder due to one or more solid—solid phase transitions below the melting point and have, therefore, plastic properties and good mechanical flexibility as well as improved electrode|electrolyte interfacial contact. In particular, protic organic ionic plastic crystals (POIPCs), which are solid protic organic salts formed by proton transfer from a Brønsted acid to a Brønsted base and in essence are protic ionic liquids in the molten state. Examples of these crystals may include 1,2,4-triazolium perfluorobutanesulfonate and imidazolium methanesulfonate.

Anode Interface Layer

The anode interface layer described herein is not so limited. In some embodiments, the anode interface layer may address some of the above mentioned problems with traditional SSEs, including the low ionic conductivity of polymeric SSEs and the hardness of inorganic, glassy, or ceramic SSEs, which can damage a soft anode material like lithium metal or sodium metal.

In some embodiments, the anode interface layer has at least some of the following properties: low resistance, can act as shock absorber, ionically conductive, electrically insulative, is softer than the SSE, etc.

In some embodiments, the anode interface layer may be at least one selected from the group consisting of the following: lithium or sodium halide film; a porous polymer film or membrane with liquid, gel, or polymer electrolyte; a ceramic layer with a liquid, gel, or polymer electrolyte; a polymeric film without a liquid, gel, or polymer electrolyte; and combinations thereof. In some embodiments, the interface layer may comprise two or more layers, for example, a polymer film (or base film) without an electrolyte and a ceramic layer with a liquid, gel or polymer electrolyte.

In some embodiments, the anode interface layer is formed onto at least one of a surface of an anode, a surface of an SSE, or both a surface of an anode and a surface of an SSE. In some embodiments, the anode interface layer may be formed directly on a surface of the anode or SSE, and in other embodiments, there may be one or more intervening layers formed in between the anode or SSE surface and the anode interface layer. Regardless of how the interface layer is formed, in the resulting battery, the anode interface layer is between the anode and the SSE.

In some embodiments, the anode interface layer may be a film or comprise at least one film that comprises, consists of, or consists essentially of a lithium or sodium halide. For example, in some preferred embodiments, the anode interface layer may be a film or comprise at least one film that comprises, consists of, or consists essentially of lithium halide (like lithium iodide). Lithium halide is a preferred material because it is both ionically conductive and electrically insulative. Thus, the anode interface layer may be a film or comprise at least one film that comprises, consists of, or consists essentially of any material that is both ionically conductive (e.g., for lithium ions) and electrically insulative like lithium iodide is regardless of whether the material is a sodium or lithium halide.

In some preferred embodiments, an anode interface layer that includes a lithium or sodium halide is paired with an inorganic, glassy, or ceramic SSE in the HSSE described herein. The lithium or sodium halide—containing anode interface layer may act as a shock absorber to prevent damage of a soft anode material (e.g., lithium) by the inorganic, glassy, or ceramic SSE.

In some embodiments, the anode interface layer is or includes a polymer film. In some embodiments, the polymer film is nonporous, porous, microporous, macroporous, or nanoporous. In embodiments where the polymer film is nonporous, the film preferably is ionically conductive. For example, the polymer film may be made of, comprise, consist of or consist essentially of PVDF polymer or PVDF: HFP copolymer. In other preferred embodiments, the polymer film is microporous and made up of polymers such as polyolefins (e.g., PE, PP), polyamdies (e.g., nylons), or polyesters (e.g., PET), and combinations thereof. In some preferred embodiments, the polymer film is a Celgard® dry process polyolefin film or membrane manufactured by Celgard, LLC of Charlotte, NC, especially a polypropylene (PP) film or a multilayer PP and/or PE film, with good compression and rebound (good resilience over many cycles).

In some more preferred embodiments, an anode interface layer that includes a polymer film as described herein is paired with an inorganic, glassy, or ceramic SSE in the HSSE described herein. The polymer-film-containing interface layer may also act as a shock absorber to prevent damage of a soft anode material (e.g., lithium) by the inorganic, glassy, or ceramic SSE, act as an electrolyte reservoir and improve conductance, improve safety by protecting soft anodes, or combinations thereof. The polymer-film-containing interface layer may also reduce, prevent, or block dendrites.

In other embodiments, the anode interface layer is or includes a polymer film as described herein with a liquid, gel, or polymer electrolyte. The electrolyte may be coated on or soaked or impregnated into the polymer film. In embodiments where the polymer film is porous, the electrolyte may fill, coat, or both fill and coat the pores.

In some embodiments, use of a polymer film with a polymer, gel, or liquid electrolyte is preferred when the SSE has lower ionic conductivity as the electrolyte will improve ionic conductivity.

In some other preferred embodiments, the anode interface layer comprises or is a ceramic layer. The ceramic layer may comprise, consist of, or consist essentially of micro- or nano-sized particles dispersed in a binder. The particles may be heat resistant particles and the binder may be a polymeric binder.

In some embodiments the ceramic layer may be used alone as the anode interface layer and in other embodiments the ceramic layer may be coated with or soaked in or impregnated with solid, gel, or polymer electrolyte. In other embodiments, the ceramic layer may be coated on a polymer film as described herein and in other embodiments the ceramic coated polymer film may be soaked in or impregnated with or coated with electrolyte and this electrolyte filled composite can be used as the anode interface layer.

In some embodiments, the use of a ceramic layer, with or without a polymeric film and with or without electrolyte, as the interface layer may also reduce, prevent, or block dendrites. In some embodiments, addition of electrolyte improves ionic conductivity. A ceramic layer with electrolyte is preferably used with an SSE having lower ionic conductivity like a polymeric SSE.

The binder and particles of the ceramic layer are discussed in further detail below.

The polymeric binder comprises, consists of, or consists essentially of at least one of a polymeric, oligomeric, or elastomeric material and the same are not so limited. Any polymeric, oligomeric, or elastomeric material not inconsistent with this disclosure may be used. The binder may be ionically conductive, semi-conductive, or non-conductive. Any gel-forming polymer suggested for use in lithium polymer batteries or in solid electrolyte batteries may be used. For example, the polymeric binder may comprise at least one, or two, or three, etc. selected from a polylactam polymer, polyvinyl alcohol (PVA), Polyacrylic acid (PAA), Polyvinyl acetate (PVAc), carboxymethyl cellulose (CMC), an isobutylene polymer, an acrylic resin, latex, an aramid, or any combination of these materials.

In some preferred embodiments, the polymeric binder comprises, consists of, or consists essentially of a polylactam polymer, which is a homopolymer, co-polymer, block polymer, or block co-polymer derived from a lactam. In some embodiments, the polymeric material comprises a homopolymer, co-polymer, block polymer, or block co-polymer according to Formula (1):

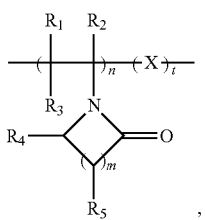

(1)

wherein $R_1$, $R_2$, $R_3$, and $R_4$ can be alkyl or aromatic substituents and $R_5$ can be an alkyl substituent, an aryl substituent, or a substituent comprising a fused ring; and wherein the preferred polylactam can be a homopolymer or a co-polymer where co-polymeric group X can be derived from a vinyl, a substituted or unsubstituted alkyl vinyl, a vinyl alcohol, vinyl acetate, an acrylic acid, an alkyl acrylate, an acrylonitrile, a maleic anhydride, a maleic imide, a styrene, a polyvinylpyrrolidone (PVP), a polyvinylvalerolactam, a polyvinylcaprolactam (PVCap), polyamide, or a polyimide; wherein m can be an integer between 1 and 10, preferably between 2 and 4, and wherein the ratio of 1 to n is such that $0 \leq 1:n \leq 10$ or $0 \leq 1:n \leq 1$. In some preferred embodiments, the homopolymer, co-polymer, block polymer, or block co-polymer derived from a lactam is at least one, at least two, or at least three, selected from the group consisting of polyvinylpyrrolidone (PVP), polyvinylcaprolactam (PVCap), and polyvinyl-valerolactam.

In a preferred embodiment, a co-polymer block co-polymer derived from a lactam comprises, in its backbone, a group capable of creating cross-linking between at least two co-polymers or block co-polymers chains. For example, the group may be an epoxide group or an alkyl amine. When the group capable of creating cross-linking between at least two co-polymers or block co-polymers chains is an epoxide, the epoxide undergoes an epoxidation reaction to create the cross-linking. In some embodiments, addition of a catalyst is required. For example, if the group capable of creating cross-linking between at least two co-polymers or block co-polymers chains is an epoxide, catalyst comprising an alkyl amine group may be added, and if the group is an alkyl amine, a catalyst comprising an epoxide group may be added. A co-polymer or block-copolymer described in this paragraph may have a structure as shown in Formula (1) above, where X is a group capable of creating cross-linking between at least two co-polymers or block co-polymers chains, e.g., an epoxide or alkyl amine-containing group. One embodiment of the co-polymer block co-polymer derived from a lactam described in this paragraph is shown below:

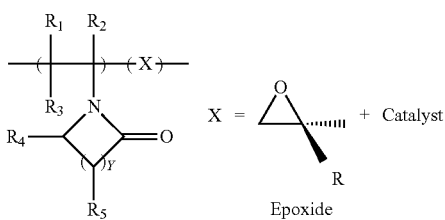

In the schematic representation directly above, the polymer chains are PVP chains so $R_1$, $R_2$, $R_3$, $R_4$, and $R_5$ in the diagram directly above the above representation are hydrogen and Y is 2. Use of a co-polymer or block co-polymer derived from a lactam that comprises, in its backbone, a group capable of creating cross-linking between at least two co-polymers or block co-polymers chain can increase thermal stability, increase electrolyte stability, improve wetting, and improve CV performance of a resulting coating layer.

In another preferred embodiment, the polymeric binder comprises, consists of, or consists essentially of polyvinyl alcohol (PVA). Use of PVA may result in a low curl coating layer, which helps the substrate to which is it applied stay stable and flat, e.g., helps prevent the substrate from curling. PVA may be added in combination with any other polymeric, oligomeric, or elastomeric material described herein, particularly if low curling is desired.

In another preferred embodiment, the polymeric binder may comprise, consist of, or consists essentially of an acrylic resin. The type of acrylic resin is not particularly limited, and may be any acrylic resin that would not be contrary to the goals stated herein, e.g., providing a new and improved coating composition that may, for example, be used to make battery separators having improved safety. For example, the acrylic resin may be at least one, or two, or three, or four selected from the group consisting of polyacrylic acid (PAA), polymethylmethacrylate (PMMA), polyacrylonitrile (PAN), and polymethyl acrylate (PMA).

In other preferred embodiments, the polymeric binder may comprise, consist of, or consist essentially of carboxymethyl cellulose (CMC), an isobutylene polymer, latex, or any combination these. These may be added alone or together with any other suitable oligomeric, polymeric, or elastomeric material.

In some embodiments, the polymeric binder may comprise a solvent that is water only, an aqueous or water-based solvent, or a non-aqueous solvent. When the solvent is water, in some embodiments, no other solvent is present. The aqueous or water-based solvent may comprise a majority (more than 50%) water, more than 60% water, more than 70% water, more than 80% water, more than 90% water, more than 95% water, or more than 99%, but less than 100% water. The aqueous or water-based solvent may comprise, in addition to water, a polar or non-polar organic solvent. The non-aqueous solvent is not limited and may be any polar or non-polar organic solvent compatible with the goals expressed in this application. In some embodiments, the polymeric binder comprises only trace amounts of solvent, and in other embodiments it comprises 50% or more solvent, sometimes 60% or more, sometimes 70% or more, sometimes 80% or more, etc.

Figure 7:
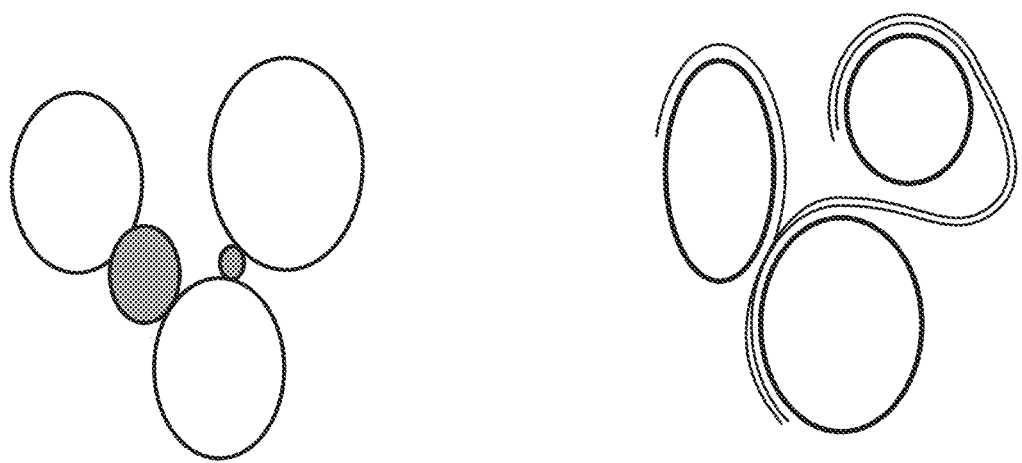
FIG. 7A is a schematic diagram of illustrating the coverage of the heat-resistant particles by the polymeric binder when the ratio of heat-resistant particles to polymeric binder is lower.
FIG. 7B is a schematic diagram of illustrating the coverage of the heat-resistant particles by the polymeric binder when the ratio of heat-resistant particles to polymeric binder is higher.
Figure 8:
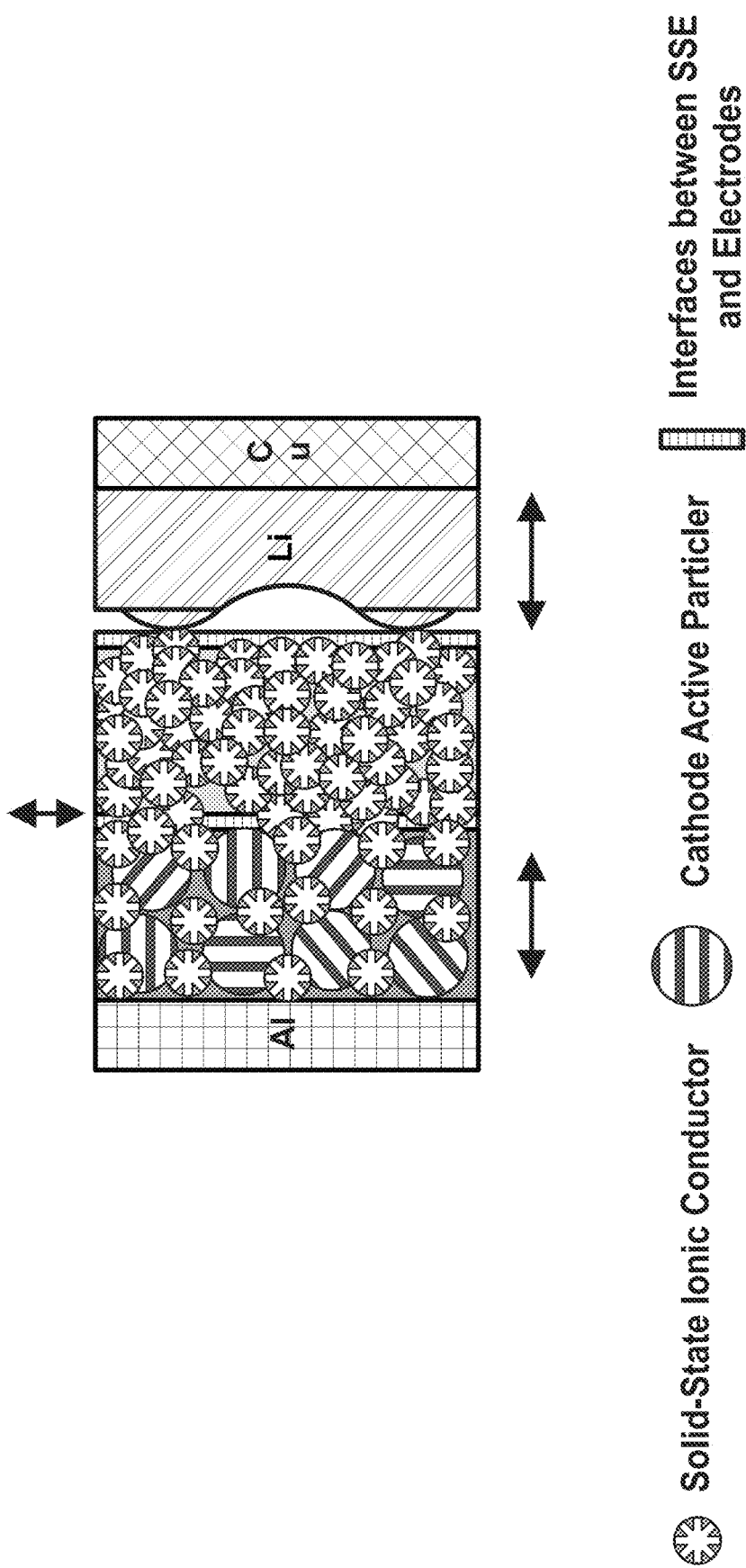
FIG. 8 schematically illustrates one issue with Li solid state electrolyte (SSE) batteries in which most of the elastic SSEs may react with a Li metal anode to form very resistive layers at the interface of the anode and the SSE.
Figure 9:
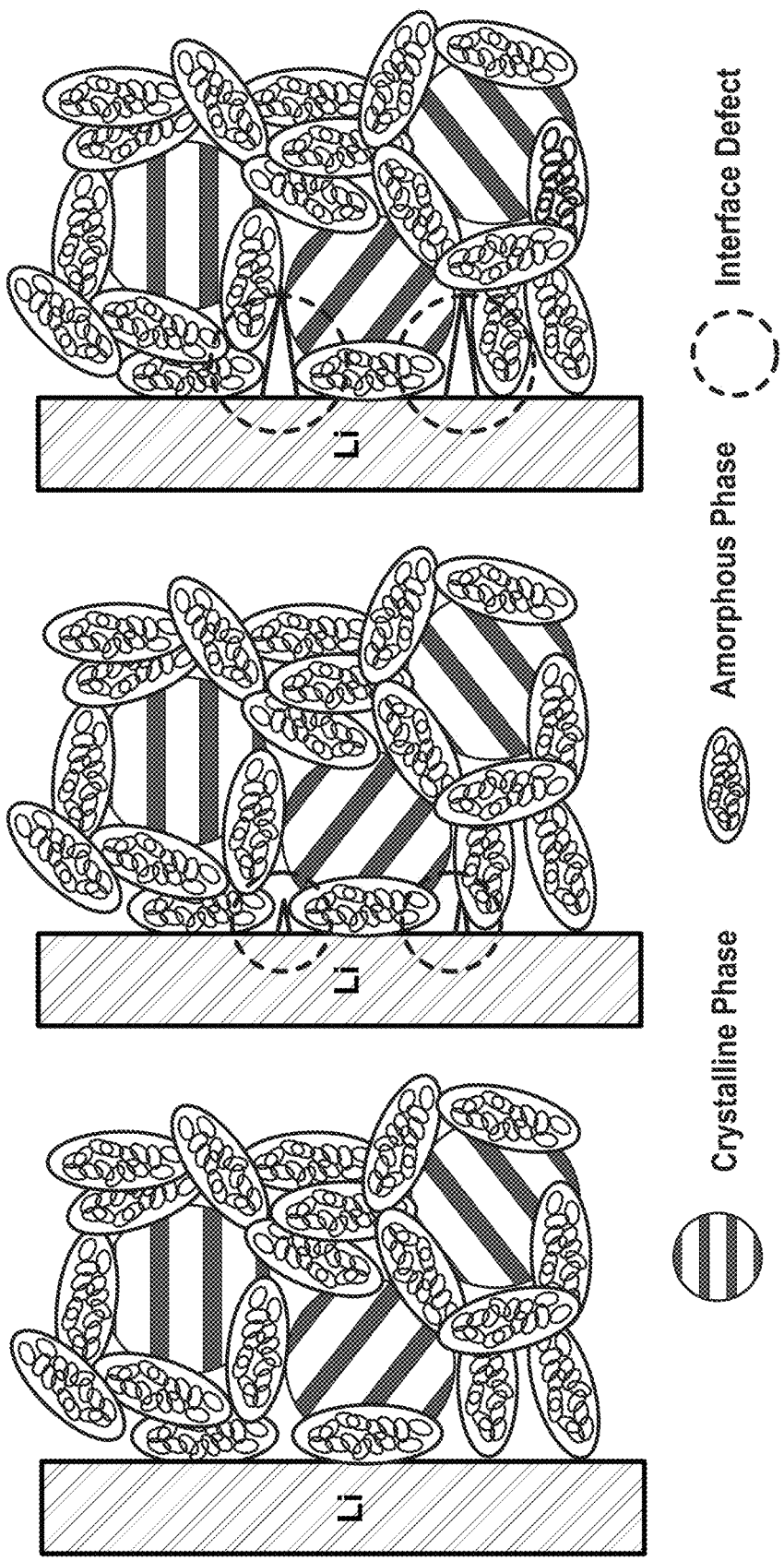
FIG. 9 schematically illustrates another issue with Li solid state electrolyte batteries in which Li deposition at the interface of an SSE and lithium metal may lead to dendrites and soft or hard shorts in the battery.

The ratio of heat-resistant particles to polymeric binder in the coating composition is, in some embodiments, 50:50 to 99:1, in other embodiments, it is 70:30 to 99:1 or 90:10 to 98:2, and in further embodiments, it is 90:10 to 99:1. This ratio affects coverage of the heat-resistant particles by the polymeric binder. For example, when the ratio of heat-resistant particles to polymeric binder is lower, there will be more coverage of the heat-resistant particles with binder (e.g., as shown in FIG. 7A), and with the ratio of heat-resistant particles to polymeric binder is higher, there will be less coverage of the heat-resistant particles, e.g., as shown in FIG. 7B).

In a preferred embodiment, at least one of the heat-resistant particles is coated or partially-coated by the polymeric binder. For example, in some embodiments, 0.01 to 99.99% of the surface area of at least one of the heat-resistant particles (or of the surface area of all of the heat-resistant particles) is coated by the binder. In some embodiments, 0.01 to 99.99% of the total surface area of the heat-resistant particles in the composition is coated with polymeric binder.

In another aspect, heat-resistant particles are added to the coating composition described herein. The size, shape, chemical composition, etc. of these heat-resistant particles is not so limited. The heat-resistant particles may comprise an organic material, an inorganic material, e.g., a ceramic material, or a composite material that comprises both an inorganic and an organic material, two or more organic materials, and/or two or more inorganic materials.

In some embodiments, heat-resistant means that the material that the particles are made up of, which may include a composite material made up of two or more different materials, does not undergo substantial physical changes, e.g., deformation, at temperatures of 200° C. Exemplary materials include aluminum oxide ($Al_2O_3$), silicon dioxide ($SiO_2$), graphite, etc. Non-limiting examples of inorganic materials that may be used to form the heat-resistant particles disclosed herein are as follows: iron oxides silicon dioxide ($SiO_2$), aluminum oxide ($Al_2O_3$), boehmite ($Al(O)OH$), zirconium dioxide ($ZrO_2$), titanium dioxide ($TiO_2$), barium sulfate ($BaSO_4$), barium titanium oxide ($BaTiO_3$), aluminum nitride, silicon nitride, calcium fluoride, barium fluoride, zeolite, apatite, kaoline, mullite, spinel, olivine, mica, tin dioxide ($SnO_2$), indium tin oxide, oxides of transition metals, and any combinations thereof.

Non-limiting examples of organic materials that may be used to form the heat-resistant particles disclosed herein are as follows: a polyimide resin, a melamine resin, a phenol resin, a polymethyl methacrylate (PMMA) resin, a polystyrene resin, a polydivinylbenzene (PDVB) resin, carbon black, graphite, and any combination thereof.

The heat-resistant particles may be round, irregularly shaped, flakes, etc. The average particle size of the heat-resistant material ranges from 0.01 to 5 microns, from 0.03 to 3 microns, from 0.01 to 2 microns, etc.

As described above, in a preferred embodiment, at least one of the heat-resistant particles added to the coating composition described herein is coated or partially-coated by the polymeric binder. In other embodiments, the heat-resistant particles may (in addition to or as an alternative to being coated or partially-coated by the polymeric binder) be coated or partially coated by a compatibilizer, e.g., a material that makes the particles more miscible with the polymeric binder. Generally, the heat-resistant particles may be coated or uncoated in any way that would not be inconsistent with the stated goals herein.

The coating composition comprises at least one, or two, or three, etc. of (a) a cross-linker, (b) a low-temperature shutdown agent, (c) an adhesion agent, (d) a thickener, (e) a friction reducing agent, and (f) a high-temperature shutdown agent.

Cathode Interface Layer

The optionally provided cathode interface layer is not so limited. Options for the optionally provided cathode interface layer are the same as those for the anode interface layer and the cathode interface layer may provide many of the same functions as the anode interface layer, e.g., acting as a shock absorber and improving ionic conductivity.

Like the anode interface layer, the cathode interface layer may be formed on at least one of a surface of the cathode, a surface of the SSE, or both a surface of the cathode and a surface of the SSE. In some embodiments, the cathode interface layer is formed directly on the surfaces and in other embodiments, there are intervening layers formed in between the surface of the cathode or SSE and the interface layer. Regardless of how the interface layer is formed, in the final battery, the cathode interface layer is always between the SSE and the cathode.

Hybrid Solid State Electrolyte

The inventive hybrid solid state electrolyte (HSSE) is not so limited. The HSSE is as described herein. The HSSE may be manufactured separately from the rest of the battery by providing at least an anode interface layer on the surface of an SSE. The anode interface layer is as described herein. In some embodiments that are preferred, the anode interface may be provided directly onto a surface of the SSE, and in other embodiments, intervening layers may be provided between the SSE and the anode interface layer. One example of a possible intervening layer is an adhesive layer.

Once assembled, the separately made and sold HSSE may be placed in a battery, e.g., a battery as described herein, with the anode interface facing towards the anode and the cathode interface layer facing toward the cathode. In some embodiments, a cathode interface layer and an anode interface layer may also be applied to a surface of the cathode and the anode, respectively. Use of the same material to form the layer on the anode and cathode as is used for the anode and cathode material of the HSSE may improve adhesion between the anode and the HSSE and the cathode and the HSSE.

Vehicle, Storage System, or Device

The batteries and HSSEs described herein may be included in any battery module or pack, vehicle, storage system, or device, including electric cars, trucks, motorcycles, scooters, etc. Use of these batteries and HSSEs is not limited.

Method of Making an HSSE

The method for forming an HSSE as described herein are not so limited. In some embodiments, the method may comprise, consist of, or consist essentially of forming an anode interface layer on a surface of an SSE. The anode interface layer and the SSE are not so limited and may be any SSE or anode interface layer as described herein. In some preferred embodiments, the anode interface layer is formed directly on a surface of the SSE, i.e., with no intervening layers formed in between. In other embodiments, the method may comprise a step of forming an intervening layer between the SSE and the anode interface layer.

In other preferred embodiments, a cathode interface layer is also formed on a surface of the SSE. The cathode interface layer is not so limited and may be any cathode interface layer described herein. The anode interface and the cathode interface layers may be formed in any order on the SSE. The anode and the cathode interface layers are formed on opposite surfaces of the SSE, so if the anode interface layer is formed first, the cathode interface layer is formed on an opposite side. If the cathode interface layer is formed first, then the anode interface layer is formed on an opposite side. In some preferred embodiments, the cathode interface layer is formed directly on a surface of the SSE, but in other embodiments, an intervening layer may be formed between the surface of the SSE and the cathode interface layer.

The HSSE may be manufactured and sold to be used, for example, in an improved solid-state battery. For example, it may be used in the improved solid state battery described herein. In the battery, the anode interface layer of the HSSE may face the anode and the cathode interface layer may face the cathode.

The method for making the HSSE may include additional steps. For example, additional steps to protect the HSSE when it is being transported or stored before use.

Method of Making an Improved Solid State Battery

The method for forming an improved solid state battery is not so limited. In some embodiments, the improved solid state battery formed is an improved solid state battery as described herein.

In some embodiments, the method for forming an improved solid-state battery may comprise, consist of, or consist essentially of, providing an anode, cathode, and SSE and then forming an anode interface layer on at least one of a surface of the anode, a surface of the SSE, or both a surface of the anode and the SSE. In some preferred embodiments, the anode interface layer is formed directly on the surface of the anode, the surface of the SSE, or both the surface of the anode and the surface of the SSE. In other embodiments, an intervening layer is formed between the interface layer and the surface of at least one of the anode, the SSE, or both the anode and the SSE.

In some embodiments, the method include a further step of forming a cathode interface layer on at least one of the surface of the cathode, the surface of the SSE, or both the surface of the cathode and the surface of the SSE. In some preferred embodiments, the cathode interface layer is formed directly on a surface of the cathode, SSE, or both. In other embodiments, an intervening layer is provided.

When a cathode interface layer is provided, the order of forming the anode interface layer and the cathode interface layer is not necessarily important. If the anode interface layer and the cathode interface layer are both formed on the SSE, then they are formed on opposite sides thereof. The only important thing is that in the final battery the anode interface layer is formed between the anode and the SSE and the cathode interface layer is formed between the cathode and the SSE.

The method for forming a battery may comprise, consist of, or consist essentially of any or all of the foregoing steps in addition to any additional steps necessary to form a functioning battery. A functioning battery is one that provides power for any length of time.

Self-Healing SSE/In-Situ HSSE

In at least one embodiment, the glassy SSE may be a self-healing SSE that includes LiI (as Li and I are included in their ion form, L+, I−, in the glassy SSE). The I-will react with the Li metal anode and form LiI at the surface. LiI is softer than the SSE, electrically insulative, and ionically conductive. This in-situ LiI forms an HSSE (LiI/SSE).

HSSE/Electrolyte Suppressing Technology/HSSE+Electrolyte Suppressing Technology

The above described HSSE performance and improved SSE Battery performance can be further improved by adding Electrolyte Suppressing Technology (for example, electrolyte additives that change V to 0.02) to further prevent dendrite formation.

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The present invention may be embodied in other forms without departing from the spirit and the essential attributes thereof, and, accordingly, reference should be made to the appended claims, rather than to the foregoing specification, as indicating the scope of the invention. Also contemplated are improved separators, improved ceramic coatings, improved anodes, and the like.

What is claimed is:

1. A battery comprises:
a lithium metal anode;
a cathode; and
a hybrid solid state electrolyte (HSSE) or interface between the anode and the cathode including:
a cathode interface layer,
a solid state electrolyte (SSE), and
an anode interface layer,
wherein the cathode interface layer is a ceramic layer and the anode interface layer is a sodium halide.

2. The battery of claim 1 wherein the hybrid solid state electrolyte (HSSE) or solid state electrolyte (SSE) comprises an isotropic and/or elastic Li-ion conductive material.

3. The battery of claim 1 wherein the SSE comprises polyethylene oxide (PEO).

4. The battery of claim 1 wherein the cathode comprises a lithium sulfide compound.

5. The battery of claim 4 wherein the lithium sulfide compound is $Li_2S_6$.

6. The battery of claim 1 wherein the battery is a Li battery, secondary Li battery, SSE battery, solid state battery, solid state lithium battery, HSSE battery, hybrid electrolyte battery, multiple electrolyte battery, Li metal battery, secondary Li metal battery, SSE Li metal battery, solid state Li metal anode battery, solid state Li metal lithium battery, HSSE Li metal battery, hybrid electrolyte Li metal battery, multiple electrolyte li metal battery, and combinations thereof.

7. In a device, product or vehicle, the improvement comprising the battery of claim 1.

8. In a solid state electrolyte (SSE) battery, the improvement comprising:
a Li metal anode;
a Li Cobalt or Li Sulfur cathode;
and,
a hybrid solid state electrolyte (HSSE) including:
a SSE, and a cathode interface layer, and
an anode interface layer, wherein the cathode interface layer is a ceramic layer and the anode interface layer is a sodium halide.

9. An improved solid state electrolyte (SSE) battery comprising, in the following order:
a lithium metal or sodium metal containing anode;
a hybrid solid state electrolyte (HSSE); and
a cathode,
wherein the HSSE comprises, in the following order: an anode interface layer, an SSE layer, and a cathode interface layer, and wherein
the cathode interface layer is provided on at least one of a surface of the cathode, a surface of the SSE, or both a surface of the cathode and a surface of the SSE, and the anode interface layer is provided on at least one of a surface of the anode, a surface of the SSE, or both a surface of the anode and a surface of the SSE, wherein the cathode interface layer is a ceramic layer and the anode interface layer is-a sodium halide.

10. The battery of claim 9, wherein the lithium-metal-containing or sodium metal-containing anode is made up of at least one selected from the group consisting of lithium metal, $LiC_6$, $Li_{22}Si_5$, $Li_{15}Si_4$, $Li_{22}Sn_5$, $LiAl$, $Li_{22}Pb_5$, Li/graphene, Li/Cu, Li/Si, Li/Sn, Li+transition metal, sodium metal, $Na/C_6$, or combinations thereof.

11. The battery of claim 9, wherein the cathode is made up of lithium sulfide, a lithium cobalt based alloy, a lithium iron based alloy, Li sulfur, Sulfur, Air, $NaCoO_2$, or $O_2$.

12. The battery of claim 9, wherein the anode interface layer has at least one of the following properties: it is softer than the SSE, it conducts ions and it is electrically insulative.

13. A hybrid solid state electrolyte (HSSE) comprising, in the following order:
   an anode interface layer, a solid state electrolyte (SSE), and a cathode interface layer;
   wherein the cathode interface layer is a ceramic layer and the anode interface layer is a sodium halide.

14. The HSSE of claim 13, wherein:
   the anode interface layer and the cathode interface layer are present, the anode interface layer is provided directly on a surface of the SSE, and the cathode interface layer is provided directly on a surface of the SSE opposite to the surface that the anode interface layer is provided directly on.

15. The HSSE of claim 13, wherein the SSE is a ceramic SSE.

\* \* \* \* \*